(12) United States Patent
Sayers et al.

(10) Patent No.: US 9,758,363 B2
(45) Date of Patent: Sep. 12, 2017

(54) COOKING OIL DELIVERY SYSTEM AND METHOD

(71) Applicant: The Filta Group, Inc., Orlando, FL (US)

(72) Inventors: Jason Sayers, Windermere, FL (US); Paul Plooster, Jordan, MN (US); Victor Clewes, Orlando, FL (US)

(73) Assignee: The Filta Group, Inc., Orlando, FL (US)

( * ) Notice: Subject to any disclaimer, the term of this patent is extended or adjusted under 35 U.S.C. 154(b) by 248 days.

(21) Appl. No.: 14/394,884

(22) PCT Filed: Apr. 16, 2013

(86) PCT No.: PCT/US2013/036726
§ 371 (c)(1),
(2) Date: Oct. 16, 2014

(87) PCT Pub. No.: WO2013/158606
PCT Pub. Date: Oct. 24, 2013

(65) Prior Publication Data
US 2016/0052773 A1   Feb. 25, 2016

Related U.S. Application Data

(60) Provisional application No. 61/625,344, filed on Apr. 17, 2012.

(51) Int. Cl.
*B67D 7/02* (2010.01)
*B60P 3/22* (2006.01)
(Continued)

(52) U.S. Cl.
CPC ............ *B67D 7/02* (2013.01); *B60P 3/224* (2013.01); *B60P 3/228* (2013.01); *B67D 7/0294* (2013.01);
(Continued)

(58) Field of Classification Search
CPC ...................................................... B67D 7/02
(Continued)

(56) References Cited

U.S. PATENT DOCUMENTS 5,249,511 A   10/1993   Shumate et al.
5,964,258 A   10/1999   Schoenbauer
(Continued)

*Primary Examiner* — Timothy L Maust
*Assistant Examiner* — Timothy P Kelly
(74) *Attorney, Agent, or Firm* — Christopher M. Ramsey; GrayRobinson, P.A.

(57) ABSTRACT

A delivery system includes a transportation container for cooking oil carried by a delivery vehicle for filling a storage container located at a restaurant. A flexible conduit is temporarily connected between the transportation container and the storage container. The oil is pumped from the transportation container to the storage container. A pressure sensor, carried by the vehicle downstream the pump, monitors pressure in the storage container. A processor operates with the pressure sensor for determining a pressure level in the storage container and controls delivery of the oil for limiting a pressure level to a preselected value. The system waits a period of time and tests the pressure to allow the pressure in the storage container to equalize so that pressure in the conduit at the vehicle is the same as pressure in the storage container. The pressure level is used to establish the amount of cooking oil delivered.

20 Claims, 3 Drawing Sheets

(51) Int. Cl.

| | | |
|---|---|---|
| *B67D 7/32* | (2010.01) | |
| *B67D 7/36* | (2010.01) | |
| *B67D 7/62* | (2010.01) | |
| *B67D 7/38* | (2010.01) | |
| *B67D 7/78* | (2010.01) | |
| *F04B 53/10* | (2006.01) | |
| *G05D 16/20* | (2006.01) | |
| *B67D 7/40* | (2010.01) | |
| *B67D 7/42* | (2010.01) | |

(52) U.S. Cl.
CPC ............ *B67D 7/32* (2013.01); *B67D 7/3209* (2013.01); *B67D 7/362* (2013.01); *B67D 7/38* (2013.01); *B67D 7/62* (2013.01); *B67D 7/78* (2013.01); *F04B 53/10* (2013.01); *G05D 16/2066* (2013.01); *B67D 7/40* (2013.01); *B67D 7/42* (2013.01)

(58) Field of Classification Search
USPC ..................................... 141/231, 95, 98, 1–2
See application file for complete search history.

(56) References Cited

U.S. PATENT DOCUMENTS

| | | |
|---|---|---|
| 6,041,802 A | 3/2000 | Nelson |
| 6,715,514 B2 | 4/2004 | Parker et al. |
| 6,792,983 B2 | 9/2004 | Allora |
| 7,938,959 B1 | 5/2011 | Inman et al. |
| 2003/0079799 A1* | 5/2003 | Few ..................... B60S 5/00 141/65 |
| 2008/0063544 A1 | 3/2008 | Duncan |
| 2011/0176792 A1 | 7/2011 | Arnold et al. |
| 2012/0192646 A1 | 8/2012 | Arnold et al. |

* cited by examiner

COOKING OIL DELIVERY SYSTEM AND METHOD

CROSS-REFERENCE TO RELATED APPLICATIONS

This application claims the benefit of U.S. Provisional Application No. 61/625,344, filed Apr. 17, 2012, the disclosure of which is hereby incorporated by reference herein in its entirety and commonly owned.

FIELD OF THE INVENTION

The present invention generally relates to distribution and delivery of cooking oil, and more particularly to a system and method for safely and reliably supplying and replenishing cooking oil at a commercial kitchen, such as at a restaurant site.

BACKGROUND OF THE INVENTION

It is well known in the art, and as disclosed in U.S. Pat. No. 5,964,258, restaurants, especially fast food restaurants, typically use large quantities of cooking oil and dedicated fryers during the preparation of foods. The cooking oil is typically shipped in containers and stored in a storeroom within the restaurant complex. The cooking oil containers occupy significant amounts of valuable space within the storeroom, and thus will typically reduce potentially available retail space due to a need larger storeroom space. Generally, the containers are manually carried from the storeroom to a fryer vat, where the oil is then poured into the fryer vat. Typically, the containers are not reused, thus adding to waste, another problem seeing a solution in our current environment. The containers are generally hauled away as trash and delivered to a waste disposal facility.

As is typical in the art, the containers of cooking oil are generally 5 gallon jugs or boxes weighing about 35 pounds, with such boxes required to be easily accessible to the kitchen area. As discussed above, storing such containers and having to dispose of them is wasteful. In addition, injury to kitchen staff is a concern when the boxes have to be carried from their storage area to the fryer vats for filling. It is not unusual for kitchen staff to receive burns and injuries resulting when the cooking oil is added to the fryer vat requiring a replenishing of the cooking oil. Handling the cooking oil in this manner also results in oil spills and dangerous walking areas within the kitchen.

It is also well known to have cooking oil systems employing tank storage with the tanks installed on site at the restaurant location, the cooking oil being delivered in bulk using a transport system as described by way of example with reference to U.S. Pat. No. 5,964,258 for a bulk cooking oil supply and delivery. Plumbing lines provide a connection between the storage tanks and the fryers. Such lines are plumbed into the restaurant to relocate the oil from the tanks to the fryers. The oil is sent from the tank to the fryer typically using a pump. While pumps have been used for pumping liquids from storage to user areas, it is also known in the restaurant industry that such pumps used to pump cooking oil from storage tanks to user areas frequently fail causing delay in operation of the restaurant, and an undesirable inefficiency in using the fryer vats. Further, it is appreciated by those of skill in the art that such pumps also require maintenance and power. Typically the bulk oil is delivered to the restaurant in trucks on a regular basis as demanded by use.

Systems are also known that employ pressurized tanks as described in US Patent Application Publication US 2012/0192646 describing a storage tank assembly and system for storing waste cooking oil. Further, the storage tank typically includes level sensing devices such as floats that provide information regarding the level of the cooking oil in the storage tank to the delivery truck so as to indicate when a sufficient amount of cooking oil has been provided to the storage tank. It is well known in the art that such delivery systems can be relatively expensive to install and include many components that result in an additional expense to maintain.

SUMMARY OF THE INVENTION

With such problems as identified above, by way of example, the present invention is directed to an efficient system and method for delivering and replenishing oil to fryer vats. Embodiments may include having the cooking oil delivered in a bulk manner to a commercial kitchen by pumping the oil into a pressurized storage tank installed on site at the restaurant area. Fluid lines run from the pressurized storage tank to the fryers wherein the pressure in the storage tank is used to force the cooking oil into the fryers, thus eliminating a need for a pump or typical pump operating equipment.

A system embodiment may comprise a transportation container carried by a delivery vehicle and a storage container located external to the delivery vehicle. A conduit is in fluid connection between the transportation container and the storage container. A pump may be carried by the vehicle and operable with the conduit for pumping the cooking oil from the transportation container to the storage container. A pressure sensor is operable with the conduit downstream the pump for monitoring pressure in the storage container through the fluid connection of the conduit therewith. A processor is operable with the pressure sensor for determining a pressure level in the storage container and controlling operation of the pump for limiting the pressure level to a preselected value.

A method aspect of the invention may comprise controlling a flow of the cooking oil to the storage container for limiting a volume of the cooking oil delivered to the storage container to a preselected amount, wherein the pumping is stopped intermittently for a preselected time period after the preselected amount has been pumped to the storage container.

Yet further, the processor may be operable with the pump for providing a pumping interval to the pump that limits the pumping of the cooking oil from the transportation container to the storage container to pumping intervals sufficient for allowing an equalization of pressure within the conduit and storage container. The controlling may comprise monitoring pressure in the conduit downstream the pump, limiting the delivering of a volume of the cooking oil to a preset volume, stopping the pumping when the preset volume is delivered, resuming the pumping after a preset time period, continuing the pressure monitoring, stopping the pumping when the preset volume is again delivered, resuming the pumping after the preset time period, and continuing the pumping and stopping until a maximum pressure is reached indicative of a volume of the cooking oil to be delivered to the storage container. It is desirable to have the preset time period sufficient for allowing an equalization of pressure in the conduit and the storage container.

BRIEF DESCRIPTION OF THE DRAWINGS

Embodiments of the invention are described by way of example with reference to the accompanying drawings in which.

For a fuller understanding of the invention, reference is made to the following detailed description, taken in connection with the accompanying drawing and illustrating one embodiment of the present invention, in which the attached figure is a diagrammatical illustration of a cooking oil delivery system in keeping with the teachings of the present invention.

DETAILED DESCRIPTION OF EMBODIMENTS

The present invention will now be described more fully hereinafter with reference to the accompanying drawings, in which embodiments of the invention are shown by way of illustration and example. This invention may, however, be embodied in many forms and should not be construed as limited to the embodiments set forth herein. Rather, these embodiments are provided so that this disclosure will be thorough and complete, and will fully convey the scope of the invention to those skilled in the art. Like numerals refer to like elements.

The present invention will now be described more fully with reference to the accompanying drawings in which alternate embodiments of the invention are shown and described. It is to be understood that the invention may be embodied in many different forms and should not be construed as limited to the illustrated embodiments set forth herein. Rather, these embodiments are provided so that this disclosure may be thorough and complete, and will convey the scope of the invention to those skilled in the art.

Figure 1:
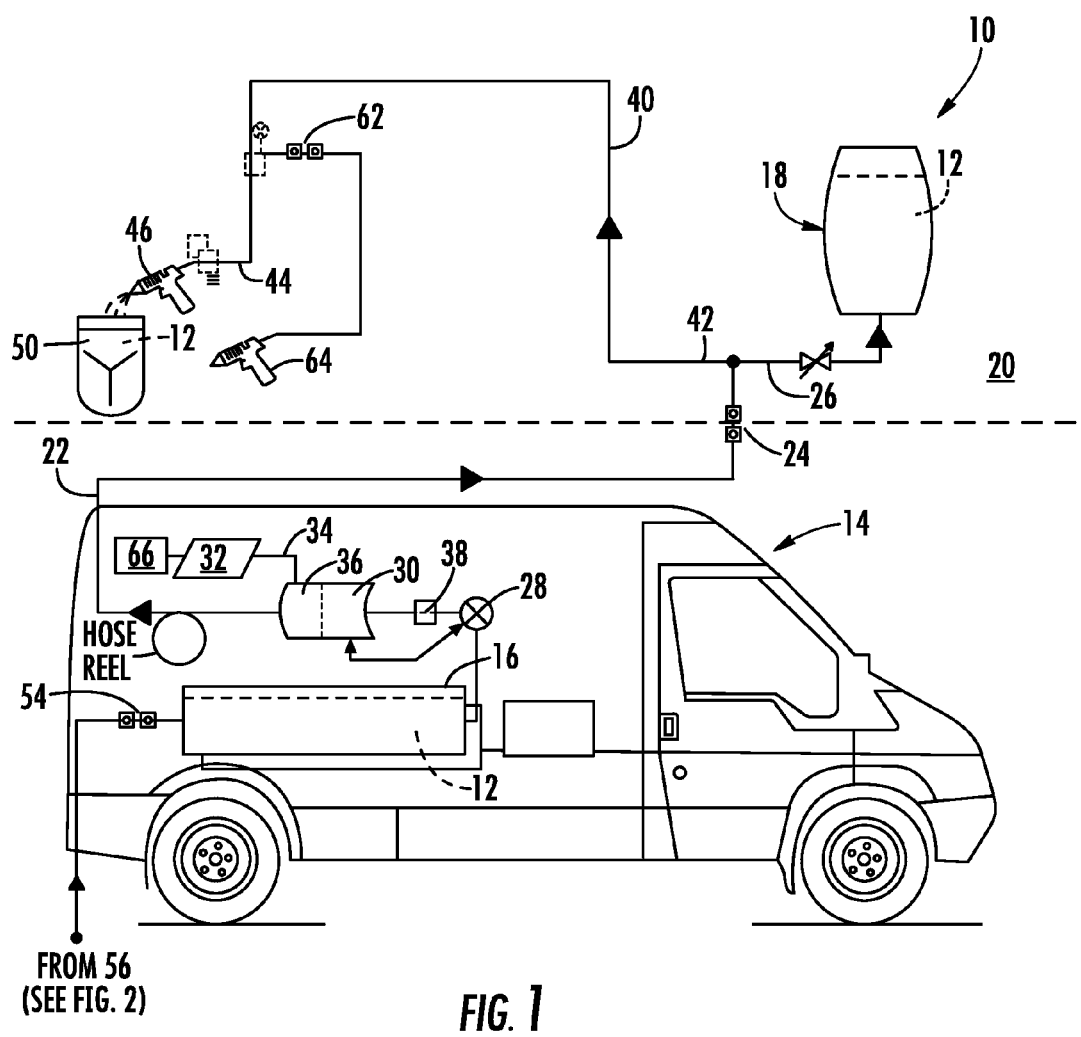
FIG. 1 is a diagrammatical illustration of one embodiment of the invention directed to delivering cooking oil to a facility and having capability at the facility for filling a cooking fryer, by way of example.
Figure 3A:
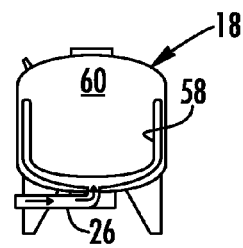
FIGS. 3A, 3B, 3C and 3D are diagrammatical illustrations of one pressurized storage container having a vinyl liner and operation thereof form an empty container, to the container being filled with a cooking oil, to a preselected filled container, and to the cooking oil being removed from the storage container under pressure, respectively.
Figure 3B:
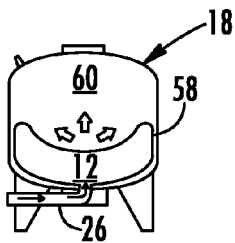
Figure 3C:
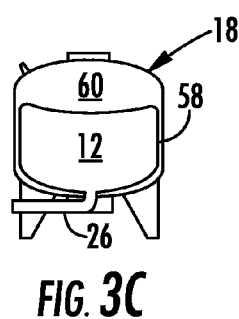
Figure 3D:
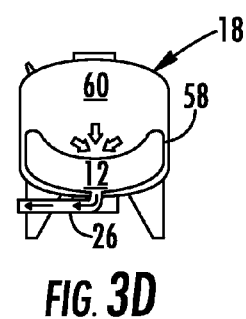

With reference initially to FIG. 1, one system 10 for delivering cooking oil 12 includes a delivery vehicle 14 carrying a transportation container 16 having the cooking oil therein for delivery to a storage container 18 located at a restaurant location 20 remote from the delivery vehicle. A conduit 22, generally a flexible hose as herein illustrated by way of example, is placed in a fluid connection from the transportation container 16 to the storage container 18 using a quick-connect fitting 24 to an oil line portion at the restaurant location 20. The quick-connect fitting 24 allows connection between the conduit 22 and the oil line conduit portion 26, herein described by way of example, without need for an installation tool.

With continued reference to FIG. 1, a pump 28 is carried by the vehicle 14 and is operable with the conduit 22 for pumping the cooking oil from the transportation container 16 to the storage container 18. A pressure sensor 30 is also carried by the vehicle 14 and is operable with the conduit 22 downstream the pump 28 for monitoring pressure in the storage container 18 through the fluid connection of the conduit 22. A processor 32, also carried by the vehicle 14, communicates via a connection 34 with the pressure sensor 30 for determining a pressure level in the storage container 18 and controlling operation of the pump 28 for limiting the pressure level to a preselected value, as will be described in greater later in this disclosure.

With continued reference to FIG. 1, a flow controller 36 is operable with the pump 28, and may be formed as a portion of the pump, for controlling a flow of the cooking oil 12 delivered to the storage container 18, wherein the processor 32 is operable with the flow controller for monitoring and limiting a volume of the cooking oil delivered to the storage container 18 to a preselected amount. In addition, and as will be further described later in this disclosure, the processor 32 may provide a pumping interval to the pump 28 that limits the pumping of the cooking oil 12 from the transportation container 16 to the storage container 18 to pumping intervals sufficient for allowing an equalization of pressure within the conduit 22 and the storage container 18.

With continued reference to FIG. 1, a check valve 38 is placed within the conduit 22 downstream the pump 28 for preventing flow toward the pump.

A fluid transfer line 40 is connected to the storage container 18 and has one end 42 connected to the oil line portion 26, as herein described by way of example, for receiving the cooking oil 12 from the storage container 18, and a second end 44 operable with a nozzle 46. Optionally, a fluid flow reducer 48 may be operable with the nozzle 46 for controlling flow of the cooking oil 12 to an appliance, such as a fryer.

Figure 2:
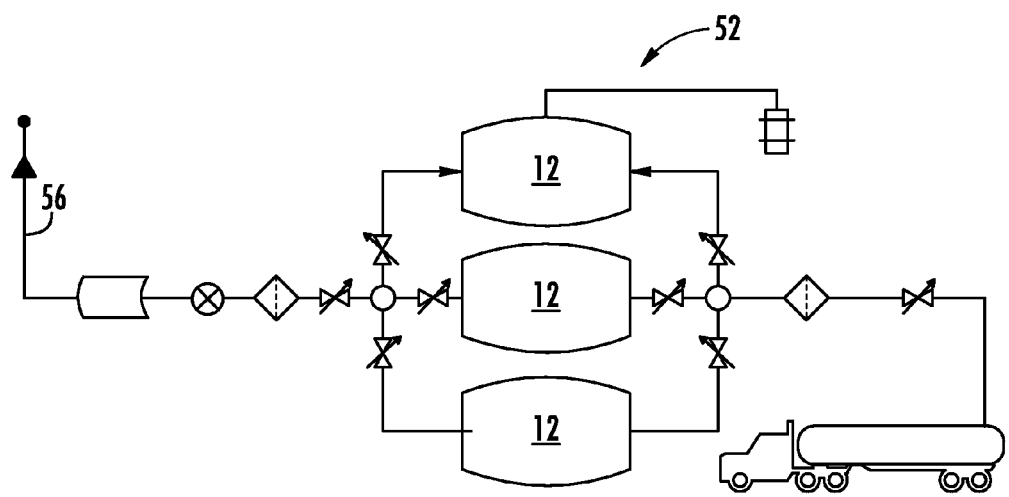
FIG. 2 is a diagrammatical illustration of one embodiment of the invention wherein a transportation container carried by a transport vehicle is filled.

As illustrated by way of example, it will be understood by those of skill in the art that one embodiment may comprise storing of the cooking oil 12 within the restaurant environment 20 and delivering the cooking oil to the fryer 50. A second embodiment may comprise delivering the cooking oil 12 to the restaurant environment 20 using the delivery vehicle 14, such as a van or the like. Yet further as illustrated with reference to FIG. 2 a third embodiment may comprise preparing the delivery vehicle 14 FIG. 1 or delivery of the cooking oil 12 by filling the transportation container 16 at an oil depot 52 using a second quick-connect fitting 54 from a depot oil line 56 to the transportation container.

As above described, one embodiment includes storing the cooking oil 12 within the restaurant environment 20 in a pressurized storage container 18 installed, by way of example, on site in a commercial kitchen area of a restaurant.

As illustrated with reference to FIGS. 3A-3D, the cooking oil 12 may be pumped from the delivery vehicle 14 into the storage container 18, wherein one embodiment of the storage container may include a flexible bladder 58, such a s vinyl bladder. As illustrated with reference to FIG. 3A, wherein the container 18 is essentially empty of oil, air expands filling an area 60 above the bladder 58 within the sealed container. As oil is pumped into the storage container 18, the air in the area 60 is compressed above the bladder 58, as illustrated with reference to FIG. 3B. When the pumping is completed, the compressed air pressurizes the oil filled bladder 58, as illustrated with reference to FIG. 3C. Operating the nozzle 46, described earlier with reference to FIG. 1, allows the oil under pressure to be removed from the container 18, as illustrated with reference to FIG. 3D.

In one method according to the teachings of the present invention, and as supported by the above, the cooking oil 12 is delivered to a storage container 18 located in a restaurant for use in a food fryer 50, by way of example, wherein oil levels in the storage container are determined from the delivery vehicle 14 situated outside the restaurant based on a pressure reading of the storage container 18. By way of example, a "full level" indication is provided at the vehicle 14 to let the system 10 know when to stop pumping. Typically, there would be a need for a service provider delivering the oil to read a dial if manual, interpret the dial, decide how much oil is required and pump that amount of oil, or have a switch that sends a message when the storage container is full. When delivering, one would typically have to use a second cable with an electrical device to read the message. In contrast, the embodiments of the invention herein described by way of example, know that the storage container 18 is full when pressure in the storage container reaches a predetermined level, such as 15 psi, as measures at the vehicle 14. Therefore, there is no need for operator skill as is known to be typically needed or the need for pressure level switches and separate reading devices.

As above described, in order to measure the pressure of the storage container 18, there is the pressure sensor 30 carried at the vehicle 14. However, the oil 12 has varying viscosities at varying temperatures. As the oil gets colder, its viscosity increases. When the is pumped from the transportation container 16, the system 10 recognizes the pressure but, without an interval pumping as herein described, the pressure in the conduit 22 at the vehicle 14 is generally greater than the pressure at the storage container 18 due to the increased viscosity of the oil. While such may be calculated, the viscosity changes depending upon outside temperatures, and thus calculations are not practical. The methods according to the teachings of the present invention overcome this problem.

By way of example, one method may comprise controlling a flow of the cooking oil 12 to the storage container 18 for limiting a volume of the cooking oil delivered to the storage container to a preselected amount, wherein the pumping is stopped intermittently for a preselected time period after the preselected amount has been pumped to the storage container, as illustrated with reference to the flow chart of FIG. 4. The processor 32 operates with the pump 28 to provide a pumping interval to the pump that limits the pumping of the cooking oil 12 from the transportation container 16 to the storage container 18 to pumping intervals of 5 gallons, by way of example, and stops the pumping for 3 seconds, by way of further example, or period sufficient for allowing an equalization of pressures within the conduit and storage container based on environmental conditions.

Figure 4:
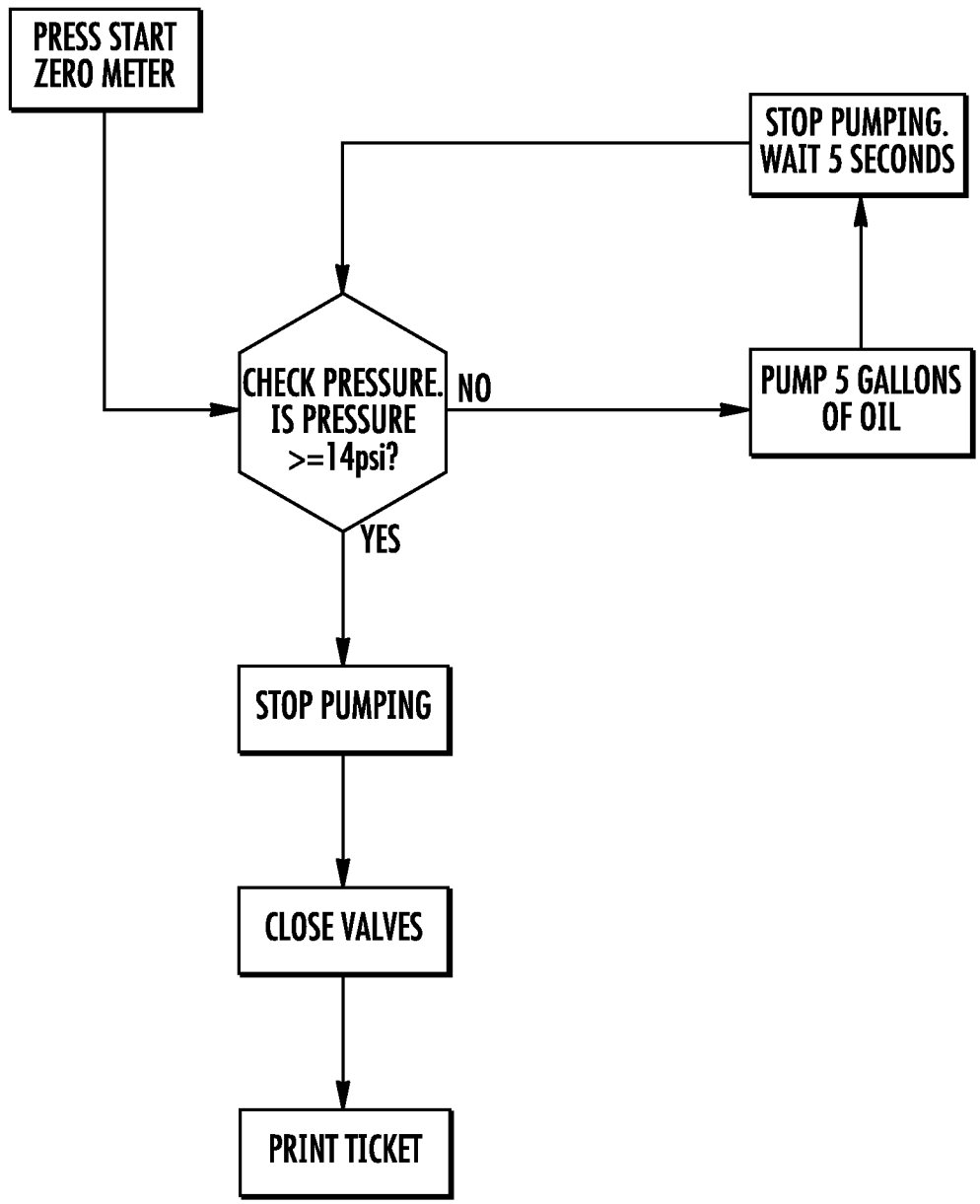
FIG. 4 is a process flow chart illustrating one method according to the teachings of the present invention of controlling delivery of the cooking oil in the transportation container to the storage container illustrated in FIG. 1

By way of continued example, one method may comprise monitoring pressure in the conduit 22 downstream the pump 28 and limiting the delivering of a volume of the cooking oil to a preset volume, such as 5 gallons, as illustrated with continued refereed to FIG. 4. The pumping is stopped when the preset volume of 5 gallons is reached and the pumping is resumed after the preset time period of 3 seconds. The pressure monitoring continues as does the stopping the pumping when the preset volume is again delivered and the resuming of the pumping after the preset time period until a maximum pressure, such as 14 psi by way of example for the container herein described by way of example is reached, which is indicative of a volume of the cooking oil 12 to be delivered to the storage container 18. The system pumps a volume of oil and stops waits and monitoring pressures until time allows the pressure in the storage container to equalize so that the pressure reading at the vehicle is the same pressure as in the storage container. If the pressure is not greater than a pre-set pressure (14 psi), then the system pumps another 5 gallons and repeats the pressure testing process until the pressure is equal to or exceeds 14 psi.

It has been shown that a desirable system operates at pressures between 2 psi and 15 psi, but such pressures are presented by way of example only, and are intended to limit system parameters. One embodiment of the system is such that once the pressure in the pressure tank reaches 15 psi, the tank is considered to be full and the pumping from the delivery vehicle automatically shuts off or may manually be turned off, as desired. By way of example, when at 2 psi, the meter within the delivery truck indicates empty, thus requiring a need to deliver the oil.

As illustrated for the embodiment herein presented by way of example, the nozzle 46 described with reference to FIG. 1, may include a wand or flow regulator used by the restaurant staff member to fill or replenish the fryer 50. The wand 46 dispenses the oil 12 based on pressure provided to the storage container 18, without need for a pump. The staff member can thus take the wand, press a handle/button, and force the oil into the fryer from the pressurized storage tank. The oil is thus transferred to the to the fryer using the pressure from the storage container and does not require an actual pump for transporting the cooking oil.

By way of example, the flow out of the wand used by the staff member may be limited (typically 3 gpm) to prevent hot oil from splashing back onto the staff member when replenishing the oil in the fryer (a topping off of the fryers).

With reference again to FIG. 1, optionally a separate junction 62 in the form of a quick-connect fitting may be fitted to the transfer line 40 that allows for an additional wand to be inserted, by way of example. This may be helpful in situations where a fryer technician may wish to fill the fryers more quickly using an alternate wand system.

With continued reference to FIG. 1, the delivery vehicle 14 may desirably be a van, a relative small vehicle, as will be appreciated by those of skill in the art. The transportation container 16 may comprise a 200 gal tank, by way of example. The pump 28 may have a pumping capacity of 10 gpm. A printer 66 may be operated by the processor 32 to provide a delivery report.

By way of further example, problems well known in the art are solved by the teachings of the present invention. Typically, when filling a bulk oil tank in a commercial kitchen facility such as in a restaurant, one needs some type of volume meter or level meter to indicate when a pump has provided the appropriate amount of cooking oil to a full level and thus can stop the oil delivery. This can be expensive and cumbersome. With embodiments of the present invention, when the hose from the van connected to a quick connect on the tank is connected, the control equipment in the van senses the pressure in the storage tank. When the pressure reaches a preselected level, the control equipment senses when the tank is full and stops pumping. The pressure at the controls is actually higher than the final tank pressure due to a restriction in the fill line. This is compensated for automatically.

Further, calculating the volume of cooking oil sold to satisfy the weights and measures laws can be difficult because the oil is being delivered a distance away using a fill line. The teachings of the present invention have the fill line full of oil at all times so it is full before oil is pumped from the delivery vehicle and full afterwards. Therefore, the volume that passes the meter in the van is exactly the same as the volume that is delivered in the tank By way of example, keeping the flow rate relatively low at the fryer provides for a safe operation because the staff member is topping off the fryer and injecting fresh oil into hot oil that typically risks splashing. A flow reducer 48 may thus be used to limit the flow rate to a preselected safe flow rate.

To allow for problems occurring when the distance from the vehicle to the quick connect 24 is too far, a separate hose length, permanently full of oil, may be provided that has quick connects at each end. This can be used as an extension fill line in extreme cases.

By way of yet another example, there is a need to record the oil metered during delivery. To address such a need, the printer 66 is provided at the delivery vehicle. A ticket for the volume of oil sold is printed.

Many modifications and other embodiments of the invention will come to the mind of one skilled in the art having the benefit of the teachings presented in the foregoing descriptions and the associated drawings and photos. Therefore, it is to be understood that the invention is not to be limited to the specific embodiments disclosed, and that modifications and alternate embodiments are intended to be included within the scope of the claims supported by this specification.

The invention claimed is:

1. A method of delivering cooking oil, the method comprising:
   providing a delivery vehicle;
   carrying a transportation container by the delivery vehicle;
   locating a storage container external to the delivery vehicle;
   placing a conduit in fluid connection between the transportation container and the storage container, the conduit having a flexible portion therealong;
   providing a pump in fluid connection with the conduit;
   operating the pump by pumping the cooking oil from the transportation container to the storage container through the conduit;
   providing a pressure sensor downstream the pump and in communication with the conduit, wherein the pressure sensor is located at the delivery vehicle;
   operating the pressure sensor for monitoring pressure in the storage container through the fluid connection of the conduit therewith;
   processing a signal from the pressure sensor determining a pressure level in the storage container; and
   controlling operation of the pump for limiting the pressure level to a preselected value.

2. The method according to claim 1, further comprising controlling a flow of the cooking oil to the storage container for limiting a volume of the cooking oil delivered to the storage container to a preselected amount.

3. The method according to claim 2, wherein the pumping is stopped intermittently for a preselected time period after the preselected amount has been pumped to the storage container.

4. The method according to claim 3, wherein a processor operable with the pump provides a pumping interval to the pump that limits the pumping of the cooking oil from the transportation container to the storage container to pumping intervals sufficient for allowing an equalization of pressure within the conduit and storage container.

5. The method according to claim 2, wherein the controlling comprises:
   monitoring pressure in the conduit downstream the pump;
   limiting a volume of the cooking oil to a preset volume;
   stopping the pumping when the preset volume is delivered;
   resuming the pumping after a preset time period;
   continuing the pressure monitoring;
   stopping the pumping when the preset volume is again delivered;
   resuming the pumping after the preset time period; and
   continuing the pumping and stopping the pumping until a maximum pressure is reached indicative of a volume of the cooking oil to be delivered to the storage container.

6. The method according to claim 5, wherein the preset time period is sufficient for allowing an equalization of pressure in the conduit and the storage container.

7. The method according to claim 1, further comprising providing a quick-connect fitting within the conduit between the pump and the storage container for connecting portions of the conduit without an installation tool.

8. The method according to claim 1, further comprising providing a check valve within the conduit downstream the pump for preventing flow toward the pump.

9. The method according to claim 1, further comprising:
   providing a fluid transfer line operable with the storage container;
   connecting one end of the fluid transfer line to the storage container for receiving the cooking oil therefrom; and
   connecting a second end of the fluid transfer line to a nozzle.

10. The method according to claim 9, further comprising reducing flow through the nozzle for controlling the delivery of the cooking oil to an appliance.

11. The method according to claim 10, wherein the cooking oil delivering to the appliance comprises delivering the cooking oil to a fryer.

12. A system for delivering cooking oil, the system comprising:
   a delivery vehicle;
   a transportation container carried by the delivery vehicle;
   a storage container located external to the delivery vehicle;
   a conduit having a flexible portion thereof, the conduit operable in a fluid connection between the transportation container and the storage container;
   a pump operable with the conduit for pumping the cooking oil from the transportation container to the storage container;
   a pressure sensor operable with the conduit and downstream the pump for monitoring pressure in the storage container through the fluid connection of the conduit therewith, the pressure sensor carried by the delivery vehicle; and
   a processor operable with the pressure sensor for determining a pressure level in the storage container and controlling operation of the pump for limiting the pressure level to a preselected value.

13. The system according to claim 12, further comprising a flow controller operable with the pump for controlling a flow of the cooking oil delivered to the storage container, wherein the processor is operable with the flow controller for monitoring and limiting a volume of cooking oil delivered to the storage container to a preselected amount.

14. The system according to claim 13, wherein the processor provides a pumping interval to the pump that limits the pumping of the cooking oil from the transportation container to the storage container to pumping intervals sufficient for allowing an equalization of pressure within the conduit and storage container.

15. The system according to claim 12, further comprising a quick-connect fitting within the conduit between the pump and the storage container for allowing a connection between portions of the conduit providing a fluid transfer without an installation tool.

16. The system according to claim 12, further comprising a quick-connect fitting to the transportation container for delivering the cooking oil to the transportation container.

17. The system according to claim 12, further comprising a check valve within the conduit downstream the pump for preventing flow toward the pump.

18. The system according to claim 12, further comprising a fluid transfer line operable with the storage container, the fluid transfer line having one end connected to the storage container for receiving the cooking oil therefrom, and a second end operable with a nozzle.

19. The system according to claim 18, further comprising a fluid flow reducer operable with the nozzle for controlling flow of the cooking oil therethrough to an appliance.

20. The system according to claim 19, wherein the appliance comprises a cooking fryer.

\* \* \* \* \*